United States Patent Office 2,884,331
Patented Apr. 28, 1959

2,884,331

PRINTING AND DYEING OF TEXTILE MATERIALS
AND PREPARATIONS THEREFOR

Arthur Locher, Binningen, and Arnold Dürst, Basel, Switzerland, assignors, by mesne assignments, to Saul & Co., Newark, N.J., as nominee of Fidelity Union Trust Company, executive trustee under Sandoz Trust No Drawing. Application December 9, 1954
Serial No. 474,266

Claims priority, application Switzerland February 5, 1954

10 Claims. (Cl. 106—26)

The present invention relates to the printing and dyeing of textile materials and to the corresponding printing preparations.

In their copending application, Serial No. 426,549, filed April 29, 1954, the present inventors have disclosed a process for the printing of textile materials, according to which the textile materials are printed with aqueous viscose solutions which contain organic pigment dyestuffs which are stable to the aqueous viscose solutions and to the aftertreatment baths to which the prints may be subjected, and the resultant prints are then aftertreated in order to convert the water-soluble viscose into water-insoluble cellulose. The aforesaid copending application also discloses preparations to be used in such printing process, the said preparations being characterized by their content of stabilized cellulose xanthate, stable organic pigment dyestuff, and in some cases printing assistant (e.g. wetting agent, dispersing agent, etc.).

The primary object of the present invention is to embody an improved process and preparation of the above-indicated character, whereby even better prints and dyeings can be obtained than according to the aforesaid application. Briefly stated, this object is realized, and superior prints and dyeings are obtained, by the expedient of printing or dyeing the textile materials with aqueous viscose solutions which, in addition to their content of pigment or pigment dyestuff stable to the aqueous viscose solutions and to the aftertreatment baths, also contain a simple nitrogen-containing substitution product of methane.

The viscose solutions are advantageously prepared from ripened or partially ripened viscose with a content of from 6 to 10% by weight of α-cellulose, or from stabilized cellulose xanthate containing a maximum of one mol of alkali metal ion per mol of carbon disulfide. The viscose solutions themselves advantageously contain from about 1 to about 8% by weight of α-cellulose, and preferably have a pH value of about 7 to 12.

The water-soluble cellulose compounds required for the purposes of the present invention are prepared in conventional manner, for example by the treatment of cellulose with sodium hydroxide and carbon disulfide. A cellulose xanthate prepared in this manner dissolves readily in dilute aqueous caustic soda to yield viscose. The latter contains about 6 to 10% by weight of α-cellulose and substantially the same or a slightly smaller amount of sodium hydroxide. The viscose is preferably used in the ripened or partly ripened state. It has only a limited stability which, however, can be increased by the addition of alkali, it being well known that the viscose ripening process is retarded in the presence of excess alkali.

Particularly valuable for the purposes of the present invention are aqueous solutions of alkali cellulose xanthates, e.g. sodium cellulose xanthate, which contain at most the precise amount of alkali metal ion necessary for the xanthate formation, that is for example a maximum of one mol of sodium ion per mol of carbon disulfide. Such a sodium cellulose xanthate has a content of sodium hydroxide of at most 30% of the weight of the α-cellulose present in the xanthate. In the dry state, such xanthate is stable for a period of months and is therefore frequently designated "stabilized" cellulose xanthate. The said designation is used in this sense in the instant specification.

The new preparations can be made by simply admixing the viscose solution or stabilized cellulose xanthate and/or pigment or pigment dyestuff with the simple nitrogen-containing substitution products of methane. The resultant preparations are, on the one hand, easily dispersible in water or in aqueous viscose solutions; on the other hand, stabilized cellulose xanthate is particularly well soluble in aqueous suspensions of such preparations. The mixtures, free from stabilized cellulose xanthate, can be stored for an unlimited period of time; the preparations, which contain stabilized cellulose xanthate, are stable for months. The more intimately admixed the components of the preparation are, the easier it is to work with it.

The preparations according to the present invention thus consist of an intimate mixture of viscose with a content of 6 to 10% by weight of α-cellulose or of stabilized xanthate, containing a maximum of one mol of alkali metal ion per mol of carbon disulfide, with one or more simple nitrogen-containing substitution products of methane; or of an intimate mixture of one or more pigments or pigment dyestuffs with one or more simple nitrogen-containing substitution products of methane; or of an intimate mixture of the aforesaid viscose or stabilized xanthate, one or more pigments or pigment dyestuffs, and one or more simple nitrogen-containing substitution products of methane.

The content of simple nitrogen-containing substitution product of methane in the preparations according to the present invention amounts to at least half of the viscose or stabilized cellulose xanthate contained therein. Simple nitrogen-containing substitution products of methane, in the sense of the present invention, comprise derivatives of carbamic acid (e.g. urea, thiourea and urethane), water-soluble salts of thiocyanic acid (e.g. ammonium thiocyanate) and polymethylene-amines (e.g. hexamethylenediamine and hexamethylenetetramine). These simple nitrogen-containing substitution products of methane bring about a reduction in viscosity and an increase in the stability of the viscose solutions. The addition of an alkali also increases the stability of a viscose solution. Enhanced results are therefore sometimes obtained by the addition of a mixture of simple nitrogen-containing substitution product of methane and alkali.

In comparison with the effect exerted by the wetting agents, dispersing agents and other printing assistants employed in the process and in the preparations according to the aforesaid copending application, the simple nitrogen-containing substitution products of methane possess the surprising property of significantly increasing the color strength of the prints and dyeings and of improving the fastness properties thereof. Printing and dyeing pastes which contain additions of such smple nitrogen-containing substitution products of methane yield more strongly colored and more water-fast prints and dyeings than pastes which do not contain such additions. Thus, the new additions render the process of the aforesaid copending application more interesting and even more practical from the industrial standpoint. The superior character of the dyeings and prints obtained according to the invention make it possible to employ less pigment or pigment dyestuff than was heretofore necessary. It is also possible to use the additions according to the present invention with additions (wetting agents, dispersing agents or the like) such as are employed according to the aforesaid application. The action of the latter has a strongly favorable influence on the action of the former.

The textile fibers which can be dyed and printed according to the process of the present invention include natural fibers such for example as fibers and fabrics of cotton, jute, hemp, flax, straw, wool and silk, as well as artificial fibers and fabrics such for example as those of regenerated cellulose (viscose artificial silk, cellulose esters, etc.) and wholly synthetic fibrous materials. The latter comprise, among others, polyamide fibers (e.g. nylon, Perlon), polyester fibers (e.g. polyethylene terephthalate such as is commercially available under the trade names Dacron and Terylene), polyvinyl chloride fibers (e.g. PeCe fibers, Rhovyl, Fibravyl and Thermovyl), polyacrylonitrile fibers (e.g. Orlon), polystyrene fibers, mixed polymers on a vinyl chloride basis (e.g. Vinyon, Dynel, Saran, Velon, Tygan) and mixed polymers on an acrylonitrile basis (e.g. Acrilan). The invention is also excellently adapted for the printing of mixed fabrics from the aforementioned fibers such as the mixed fabrics which are frequently sold on the market; as is known, this type of mixed fabric has heretofore presented considerable difficulty in finishing by means of dyeing and printing processes.

A wide variety of pigment dyestuffs can be used in the process according to the invention. Illustrative thereof are, for example, inorganic pigment colors and synthetically produced mineral colors, carbon black (e.g. gas black), organic pigment dyestuffs such as azo dyestuffs (e.g. ice colors), lake dyestuffs (e.g. light and heavy metal lakes or precipitates with complex heavy metal salts), etc., in so far as they comply with the previously indicated requirements, namely, stability to the viscose or stabilized cellulose xanthate and to the aftertreatment baths. In order to satisfy highest fastness requirements, pigment dyestuffs of the anthraquinone, benzanthrone and phthalocyanine series are preferred. Illustrative of these are for example acylaminoanthraquinones, indanthrene, dichloro- and dibromo-indanthrenes, benzanthronylaminoanthaquinones and their coeramidonines, isothiazolanthrones, metal-free and metal-containing phthalocyanines such as simple phthalocyanine itself, copper-phthalocyanine, cobalt-phthalocyanine and nickel-phthalocyanine, halogenphthalocyanines such as hexadecachloro- or octachloro-copper-phthalocyanine, tetraphenyl-copper-phthalocyanine, tetrathiocresoxy-copper-phthalocyanine, etc.

It is advantageous to use the pigment dyestuffs in as finely subdivided form as possible in order to obtain vivid and strong dyeings or prints. Especially good results are obtained when the dispersion of the dyestuffs approximates or actually attains colloidal dimensions; pigment preparations which, after being diluted with water, can pass through filter paper without leaving appreciable residues thereon, are excellently suitable for the present process. The major portion of such pigment particles have a particle size of between about 0.5 to 1 micron.

The present invention makes it possible, by appropriate selection of pigment dyestuffs, to prepare prints which are equally as good as those obtained with vat dyes in almost any respect, as for example as regards fastness to light, to chlorine, to rubbing and to boiling. Where maximum fastness is not required, simpler and cheaper pigment dyestuffs may be employed.

In accordance with the invention, aqueous printing pastes are employed which, per kilogram of paste, contain up to about 50 grams of pigment dyestuff or pigment dyestuffs mixture (preferably in finest subdivision and optionally in the form of an aqueous paste), about 20 to 80 grams of sodium cellulose xanthate, and 40 to 400 grams of urea or other nitrogen-containing substitution product of methane. The quantity of pigment dyestuff may be increased; this is particularly desirable in the preparation of black prints. The constituents of the pastes may be admixed individually or in the form of mixtures of any desired composition of the type hereinbefore described. The prints and dyeings may be prepared in desired manner and may be worked up in various ways. Valuable results are obtained if, for example, advantageously after a so-called intermediate drying at about 40–60° C., they are developed in precipitating and desulphurizing baths and then dried.

The composition of the precipitating baths may vary within wide limits. Thus, use may advantageously be made of an aqueous bath which contains, per 1000 parts by weight of bath, 200 to 300 parts by weight of Glauber's salt, 10 to 20 parts by weight of crystalline zinc sulfate, and 100 to 150 parts by weight of concentrated sulfuric acid. Sulfuric acid of 10 to 20% strength is also alone sufficient for decomposition of the cellulose xanthate. The treatment in the preciptating bath lasts from 2 to 20 minutes and is preferably carried out at temperatures up to 40° C.; conclusion of the treatment can be recognized by the fact that a cloudy print is replaced, in the printing process, by a clear print.

After washing the thus-treated print with cold water, it is aftertreated in an aqueous bath which contains 3 to 6 parts by weight of sodium carbonate and 1.5 to 3 parts by weight of sodium bircarbonate, and if desired also 1.5 to 3 parts by weight of sodium thiosulfate, per 1000 parts by weight of bath. This treatment also lasts 2 to 20 minutes, is carried out at about 80 to 90° C., and is followed by further thorough rinsing of the print. Finally, the latter is dried. Fibers which are sensitive to treatment with alkali, as for example wool, may be treated in a bath wherein the sodium salts are replaced by an organic amine, such as triethanolamine, in an amount of 3 to 6 parts by weight per 1000 parts by weight of bath.

Excellent results are also obtained when the prints, preferably dried, are not developed by treatment in aftertreatment baths, but rather by steaming, followed by rinsing with water. The steaming procedure requires only a short time, for example 3 to 8 minutes. It is carried out at elevated temperature, preferably at 100–105° C. The steamed and rinsed material is then advantageously soaped in conventional manner at elevated temperature, preferably at 80–100° C. For this purpose, aqueous soap solutions with a content of 3 to 5 grams of Marseilles soap per liter of solution are excellently suitable.

Finally, it is also possible to subject the prints or dyeings prepared according to the present invention, if desired after an intermediate drying at 40–60° C., to temperatures of about 100° C. and over, preferably of 120–130° C., and then to rinse them with water. This fixing process takes about 5 to 10 minutes at temperatures of 120–130° C. The dried products have a cloudy appearance. The water-insoluble decomposition products of the cellulose xanthate are dissolved out by rinsing in cold water; in this way, the original pure shade of the prints are restored.

The following examples set forth presently-preferred illustrative embodiments of the invention; these are intended to be exemplary and not at all restrictive in character. In these examples, the parts are by weight, the percentages are by weight, and the temperatures are in degrees centigrade.

*Example 1*

A printing paste is prepared from 1500 parts of urea, 200 parts of sodium dinaphthylmethane disulfonate, 150 parts of stabilized sodium cellulose xanthate and 150 parts of the azo pigment dyestuff obtained by coupling diazotized 1-amino-2-methyl-4-chlorobenzene with 2-hydroxynaphthalene-3-carboxylic acid phenylamide.

130 parts of the resultant dyestuff preparation are stirred with 420 parts of water and 450 parts of 10% aqueous viscose solution to form a printing paste. A cotton fabric is printed with this printing paste, the pH of which is 12, and then the print is dried at 40–60°, treated for 2 minutes in a cold aqueous bath containing 300 grams of anhydrous sodium sulphate, 10 grams of crystalline zinc sulphate, and 150 grams of concentrated sulfuric acid per liter, and then rinsed with cold water. The print is then digested for a half hour at 90° in an aqueous bath which contains 6 grams of sodium carbonate and 1.5 grams of sodium bicarbonate per liter, again thoroughly rinsed with water, and finally dried. A red print is obtained which possesses excellent fastness to rubbing, to washing and to water.

Stabilized sodium cellulose xanthate which, in dry form, is very stable but decomposes quickly in aqueous solution is, for example, prepared as follows:

100 parts of alkali cellulose, obtained from cellulose sulfite, said alkali cellulose containing 30% of α-cellulose and 15% of sodium hydroxide, is converted, by treatment with 20 parts of carbon disulfide, into the xanthate. From the latter there is made a viscose which contains 7% of α-cellulose and 7% of sodium hydroxide. The dissolved cellulose possesses a polymerization degree of 450, the degree of xanthogenation being 0.9. The viscose is spun at −5° in a coagulation bath made of methanol. Then the sodium cellulose xanthate coagulated in fiber form is washed with ethyl ether, is dried at 60° in a current of hot air and is finally dehydrated in vacuo over a drying medium such as phosphorus pentoxide. The thus-obtained sodium cellulose xanthate possesses, when kept in vacuo, after one year a xanthogenation degree of still 0.45 and dissolves completely in water to form a colloidal solution.

*Example 2*

80 parts of a 20% aqueous paste of 1-(Bz-1'-benzanthronyl)-aminoanthraquinone and 370 parts of water are mixed with 550 parts of a colloidal solution prepared from 99 parts of urea, 33 parts of stabilized sodium cellulose xanthate and 418 parts of water.

The resultant printing paste has a pH value of 9; it is printed onto a fabric of synthetic polyamide fibers. The print is dried at 50° and treated for 5 minutes at 30° in an aqueous bath which contains, per liter, 125 grams of concentrated sulfuric acid. The print is then washed with cold water, then moved about for 30 minutes at 90° in an aqueous bath containing 3 grams of sodium carbonate and 1.5 grams of sodium bicarbonate per liter, after which it is dried. There is obtained a violet-brown print of outstanding fastness properties, particularly excellent fastness to light, to chlorine, to rubbing and to boiling.

*Example 3*

A printing paste consisting of (a) 255 parts of a dyestuff preparation made of 240 parts of urea and 15 parts of 5-(anthraquinonyl-1')-amino-1,9-isothiazolanthrone, (b) 720 parts of water, and (c) 25 parts of stabilized sodium cellulose xanthate, is neutralized by the addition of concentrated acetic acid. The resultant paste, which has a pH value of 7, is printed onto a staple rayon fabric; the print is dried at 60° and then treated for 4 minutes at 40° in an aqueous bath containing 250 grams of anhydrous sodium sulphate, 15 grams of crystalline zinc sulfate and 120 grams of concentrated sulfuric acid per liter.

The print is rinsed with cold water, then digested for about a half hour at 90° in an aqueous bath containing 3 grams of sodium carbonate, 3 grams of sodium bicarbonate and 3 grams of sodium thiosulphate per liter, then again washed with water and finally dried. There is obtained a brown-red print which satisfies the highest fastness requirements.

For neutralizing the printing paste, the acetic acid may be replaced by lactic acid or tartaric acid.

*Example 4*

A printing paste consisting of 50 parts of a 20% aqueous paste of hexadecachloro-copper-phthalocyanine, 830 parts of water, and 120 parts of a preparation consisting of 100 parts of thiourea and 20 parts of stabilized sodium cellulose xanthate, is printed onto a viscose fabric. The print is dried at 45° and is treated for 5 minutes in a cold aqueous bath containing, per liter, 200 grams of anhydrous sodium sulfate, 20 grams of crystalline zinc sulfate and 100 grams of concentrated sulfuric acid. The print is then rinsed with cold water, and thereupon moved about for 30 minutes at 80° in an aqueous bath containing 3 grams of sodium carbonate and 3 grams of sodium bicarbonate per liter. The obtained green print is finally thoroughly rinsed with water and dried. It possesses excellent fastness to light, to rubbing, to washing and to water.

*Example 5*

A paste consisting of 40 parts of an intimately ground equimolecular mixture of copper-phthalocyanine and hexadecachloro - copper - phthalocyanine, 340 parts of water, 500 parts of 10% aqueous viscose solution, 60 parts of urea and 60 parts of hexamethylenetetramine, is printed onto a Dacron fabric and the resultant print is then worked up after the manner described in Example 4. The obtained blue-green print possesses excellent fastness properties.

*Example 6*

A dyeing preparation is prepared from 200 parts of urea, 200 parts of urethane, 20 parts of sodium dinaphthylmethane disulfonate, 50 parts of stabilized sodium cellulose xanthate, and 30 parts of dibromindanthrene. 250 parts of this preparation are colloidally dispersed in 750 parts of water.

The thus-prepared paste is printed onto a wool fabric, the print dried at 40° and then treated for 5 minutes in a cold aqueous bath containing 100 grams of concentrated sulfuric acid per liter. The print is then thoroughly rinsed with cold water, and then moved about for 30 minutes in a bath, at 70°, containing 4 grams of triethanolamine per liter, and finally dried. The obtained blue print is outstandingly fast to light, to rubbing and to washing.

*Example 7*

A cotton fabric is printed with a paste consisting of 200 parts of a 20% aqueous paste of gas black, 160 parts of water, 400 parts of 9% aqueous viscose solution, and 240 parts of ammonium thiocyanate. After working up after the manner of the preceding example, a black, water-fast print is obtained.

Bronzy prints, which are likewise fast to water, are obtained when, in the present example, the gas black is replaced by aluminum powder or the like.

*Example 8*

A printing paste consisting of 100 parts of a 20% aqueous paste of the calcium-aluminum lake of 1,2-dihydroxy-anthraquinone, 200 parts of water, and 700 parts of a colloidal solution prepared from 150 parts of urea, 21 parts of stabilized sodium cellulose xanthate and 529 parts of water, is printed onto a mixed fabric of cotton and viscose artificial silk. The print is worked up after the manner described in Example 4, and there is obtained a bluish red print which is fast to washing and to water.

*Example 9*

260 parts of a dyestuff preparation, consisting of 100 parts of urea, 140 parts of hexamethylene diamine, and 20 parts of the azo pigment dye obtained by coupling diazotized 1-amino-2-nitro-4-methylbenzene with acetoacetylaminobenzene, are dissolved in 707 parts of water. To the resultant suspension, there are added 33 parts of stabilized sodium cellulose xanthate, the so-obtained paste is printed onto an acetate silk fabric, and the print is dried at 40–60°. The dried print is then steamed for 6 minutes at 100° in a steam chest, then thoroughly washed with cold water, and then soaped in an aqueous soap bath, at 80°, containing 5 grams of Marseilles soap per liter. Upon drying, the resultant product is a yellow print which possesses good fastness to washing and to water.

Example 10

A printing paste consisting of 50 parts of a 20% aqueous paste of hexadecachloro-copper-phthalocyanine, 300 parts of water, 350 parts of 9% aqueous viscose solution, and 300 parts of urea, is printed onto a viscose fabric. The print is dried at 45°, steamed for 4 minutes at 105°, rinsed in cold water, and finally soaped at 100° in an aqueous soap solution which contains 3 grams of soap per liter. The dried, resultant green print is of excellent fastness to light and of good fastness to rubbing, to washing and to water.

Example 11

A mixture consisting of 100 parts of a 20% aqueous paste of the coeramidonine derivative of 1-(Bz-1'-benzanthronyl)-amino-6,7-dichloro-anthraquinone, 600 parts of water, 200 parts of 10% aqueous viscose solution and 100 parts of thiourea is adjusted to a pH value of 9 by the addition of glycolic acid. The paste is padded onto a fabric of Acrilan fibers, the resultant dyeing dried at 50°, treated for 5 minutes in a cold aqueous bath which contains 300 grams of anhydrous sodium sulfate, 10 grams of crystalline zinc sulfate and 150 grams of concentrated sulfuric acid per liter, after which the dyeing is rinsed with cold water. It is then digested for 2 minutes at 90° in an aqueous bath which contains 6 grams of sodium carbonate and 1.5 grams of sodium bicarbonate per liter, then again thoroughly rinsed with water, and finally dried. There is obtained a level brown dyeing which possesses good fastness to light, to washing and to water.

Example 12

A mixture consisting of 100 parts of a 20% aqueous paste of copperphthalocyanine, 200 parts of water, 500 parts of a 10% aqueous viscose solution and 200 parts of urea is foularded onto a fabric of glass fibers. The dyeing is dried at 45°, steamed for 4 minutes at 105°, rinsed in cold water, and finally soaped at 100° in an aqueous soap solution which contains 3 grams of soap per liter. The thus obtained level blue dyeing is, after being dried, of excellent fastness to light and of good fastness to rubbing, to washing and to water.

Example 13

A mixture consisting of (a) 100 parts of a 20% aqueous paste of the azo pigment dyestuff obtained by coupling diazotized 1-amino-2-methyl-4-chlorobenzene with 2-hydroxynaphthalene-3-carboxylic acid phenylamide, (b) 500 parts of water and (c) 400 parts of a preparation consisting of 375 parts of urea and 25 parts of stabilized sodium cellulose xanthate, is padded onto a fabric of Dynel fibers. The resultant dyeing is dried at 40–60°, steamed for 6 minutes at 100° in a steam chest, thoroughly rinsed in cold water, and then soaped at 80° in an aqueous soap bath which contains 5 grams of Marseilles soap per liter. After drying, there is obtained a level red dyeing which possesses good fastness to boiling, to washing and to water.

Example 14

A printing paste consisting of 80 parts of a 20% aqueous paste of 1-(Bz-1'-benzanthronyl)-aminoanthraquinone, 100 parts of water, 700 parts of 9% aqueous viscose solution and 120 parts of urea, is adjusted to a pH value of 9 by the addition of concentrated acetic acid. A fabric of synthetic polyamide fibers is printed with this paste. The print is preheated to 40°, and is then heated to 120° in a drying chest. After drying, the print has a cloudy red-violet shade which, upon rinsing with cold water, is converted into a clear red-brown. The print is fast to light, to chlorine, to rubbing, to washing and to water.

Example 15

A mixture consisting of 200 parts of a 10% aqueous paste of copper phthalocyanine, 100 parts of water, and 700 parts of a colloidal solution prepared from 200 parts of urea, 21 parts of stabilized sodium cellulose xanthate and 479 parts of water, is padded onto a cotton fabric. The resultant dyeing is first subjected to a pre-drying operation at 60°. Then it is dried at 130° until it is wholly free of water. At this point, it has a cloudy green-blue shade. Upon thorough rinsing with cold water, the original pure blue shade is restored. The dyeing is fast to light, to washing and to water.

Having thus disclosed the invention, what is claimed is:

1. The method of printing or dyeing textile material and the like, which comprises applying thereto an aqueous paste consisting essentially of at least partially ripened viscose containing 6 to 10% by weight of α-cellulose, at least one member selected from the group consisting of pigments and pigment dyestuffs which are stable to viscose and to aftertreatment baths, water, and a compound selected from the group consisting of urea, thiourea and urethane, the quantity of said compound amounting to at least 50% by weight of the quantity of viscose.

2. The method of printing or dyeing textile material and the like, which comprises applying thereto an aqueous paste consisting essentially of cellulose xanthate containing not more than one mol of alkali metal ion per mol of carbon disulfide, at least one member selected from the group consisting of pigments and pigment dyestuffs which are stable to cellulose xanthate and to aftertreatment baths, water, and a compound selected from the group consisting of urea, thiourea and urethane, the quantity of said compound amounting to at least 50% by weight of the quantity of cellulose xanthate.

3. As a composition of matter, a printing preparation for printing on textile material or the like, said preparation consisting essentially of an intimate admixture of at least partially ripened viscose containing 6 to 10% by weight of α-cellulose, at least one member selected from the group consisting of pigments and pigment dyestuffs which are stable to viscose and to aftertreatment baths, and a compound selected from the group consisting of urea, thiourea and urethane, the quantity of said compound amounting to at least 50% by weight of the quantity of viscose, whereby the printing preparation may be used for textile printing in the form of an aqueous printing paste.

4. As a composition of matter, a printing preparation for printing on textile material or the like, said preparation consisting essentially of an intimate admixture of cellulose xanthate containing not more than one mol of alkali metal ion per mol of carbon disulfide, at least one member selected from the group consisting of pigments and pigment dyestuffs which are stable to cellulose xanthate and to aftertreatment baths, and a compound selected from the group consisting of urea, thiourea and urethane, the quantity of said compound amounting to at least 50% by weight of the cellulose xanthate, whereby the printing preparation may be used for textile printing in the form of an aqueous printing paste.

5. The method according to claim 1, where said last-named compound is urea.

6. The method according to claim 2, where said last-named compound is urea.

7. A textile printing preparation according to claim 3, where said last-named compound is urea.

8. A textile printing preparation according to claim 4, where said last-named compound is urea.

9. An aqueous textile printing paste which contains, per kilogram of paste, up to about 50 grams of a member selected from the group consisting of pigments and pigment dyestuffs, about 20 to 80 grams of stabilized cellulose xanthate containing not more than one mol of alkali metal ion per mol of carbon disulfide, and 40 to 400 grams of a compound selected from the group consisting of urea, thiourea and urethane, the quantity of said compound amounting to at least 50% by weight of the stabilized xanthate.

10. A textile printing paste according to claim 9, wherein said last-named compound is urea.

References Cited in the file of this patent

UNITED STATES PATENTS

| | | |
|---|---|---|
| 1,915,228 | Hegan | June 20, 1933 |
| 2,060,733 | Hunt et al. | Nov. 10, 1936 |
| 2,074,336 | King | Mar. 23, 1937 |
| 2,074,349 | Underwood | Mar. 23, 1937 |
| 2,099,782 | Weiss | Nov. 23, 1937 |
| 2,234,734 | Kline | Mar. 11, 1941 |
| 2,346,957 | Wuertz et al. | Apr. 18, 1944 |
| 2,648,611 | Richter | Aug. 11, 1953 |

FOREIGN PATENTS

| | | |
|---|---|---|
| 885,875 | France | June 15, 1943 |

OTHER REFERENCES

Preston et al.: T. Textile Ind., vol. 45, July 1954, received for publication February 7, 1953 (P.T. 504–509).